United States Patent [19]

Stover et al.

[11] Patent Number: 4,744,044
[45] Date of Patent: May 10, 1988

[54] HAND-HELD CALCULATOR FOR DIMENSIONAL CALCULATIONS

[75] Inventors: Howard H. Stover, Pasadena; Kenneth E. Alexander, Villa Park, both of Calif.; Fred P. Alexander, Stateline, Nev.

[73] Assignee: Electronic Teacher's Aids, Inc., Orange, Calif.

[21] Appl. No.: 876,488

[22] Filed: Jun. 20, 1986

[51] Int. Cl.$^4$ .......................... G06F 11/00; G06F 7/38
[52] U.S. Cl. ..................................... 364/737; 364/709; 364/715
[58] Field of Search ............... 364/709, 710, 715, 737; 235/310, 311

[56] References Cited

U.S. PATENT DOCUMENTS

| | | | |
|---|---|---|---|
| 3,593,313 | 7/1971 | Tomaszewski et al. | 364/200 |
| 3,739,161 | 6/1973 | Gross et al. | 364/709 |
| 3,863,060 | 1/1975 | Rode et al. | 235/156 |
| 3,973,113 | 8/1976 | Goldsamt | 364/709 |
| 4,048,484 | 9/1977 | Brittan | 235/156 |
| 4,051,356 | 9/1977 | Habata | 235/310 |
| 4,064,398 | 12/1977 | Kishimoto et al. | 364/709 |
| 4,081,859 | 3/1978 | Goldsamt et al. | 364/709 |
| 4,092,523 | 5/1978 | Tava et al. | 235/310 |
| 4,100,602 | 7/1978 | Shapiro | 364/715 |
| 4,100,603 | 7/1978 | Boyd | 364/771 |
| 4,195,348 | 3/1980 | Kakutani | 364/562 |
| 4,228,516 | 10/1980 | Johnston, Sr. | 364/602 |
| 4,282,514 | 8/1981 | Elkin et al. | 235/310 |
| 4,282,580 | 8/1981 | McGuire et al. | 364/734 |
| 4,319,130 | 3/1982 | Spitzner | 364/709 |
| 4,377,850 | 3/1983 | Simpson | 364/561 |
| 4,488,250 | 12/1984 | Lipsey et al. | 364/709 |
| 4,545,022 | 10/1985 | Hughins | 364/709 |

FOREIGN PATENT DOCUMENTS 2829247 1/1980 Fed. Rep. of Germany .

OTHER PUBLICATIONS

Hewlett Packard HP-65 Users' Library Catalog of Contributed Programs, Program Abstract 00437A entitled, "Fractional Arithmetic", Sep. 1974.
"Jobber II Instruction Manual", published by Calculated Industries, Inc. of Orange, California (Copyright 1983).
"Texas Instruments TI-55 II Scientific Calculator Sourcebook"; pp. i, ii, 1–39 and 1–42; Copyright 1977, 1981, 1983, 1984.

Primary Examiner—Gary V. Harkcom
Assistant Examiner—Dale M. Shaw
Attorney, Agent, or Firm—Price, Heneveld, Cooper, DeWitt & Litton

[57] ABSTRACT

The specification discloses a hand-held calculator particularly adapted for dimensional or measurement calculations. The calculator includes keys for indicating a different dimension system (e.g. feet, yards, meters) associated with each number inputted, enabling calculations to be performed on numbers from mixed dimension systems. All inputted measurements are converted to decimal feet internally to simplify calculations and simplify conversion structure and routines. Preferably, a dimension power (e.g. square or cubic) can also be associated with each input number as necessary; and the calculator calculates and displays the proper dimension power resulting from any calculation. Further preferably, the calculator includes a keyboard enabling lumber dimensions to be easily inputted for board feet calculations.

8 Claims, 8 Drawing Sheets

HAND-HELD CALCULATOR FOR DIMENSIONAL CALCULATIONS

BACKGROUND OF THE INVENTION

The present invention relates to calculators, and more particularly to calculators especially adapted to perform calculations and conversions of dimensional data.

Many calculators have been developed to perform calculations on dimensional data. One such calculator is manufactured and sold under the JOBBER II trademark by Calculated Industries, Inc. of Orange, Calif. This calculator is operable in one of three modes—feet-inches, decimal feet, or decimal meters. However, this calculator suffers at least one drawback. The programs and dimensional annunciators included in the display are incapable of indicating higher order powers (e.g. squares and cubes) when multiplication and division are performed.

Other dimensional calculators are illustrated in U.S. Pat. Nos. 4,488,250, issued Dec. 11, 1984, to Lipsey et al, entitled HAND-HELD CALCULATOR FOR PERFORMING CALCULATIONS IN FEET, INCHES AND FRACTIONS; 4,100,603, issued July 11, 1978, to Boyd, entitled FEET, INCHES AND SIXTEENTHS ADDER; 4,081,859, issued Mar. 28, 1978, to Goldsamt et al, entitled ELECTRONIC CALCULATOR FOR FEET-INCH-FRACTION NUMERICS; and 3,973,113, issued Aug. 3, 1976, to Goldsamt, entitled ELECTRONIC CALCULATOR FOR FEET-INCH-FRACTION NUMERICS. However, all of these calculators also suffer the above noted problem of an inability to process and display higher order dimensions

SUMMARY OF THE INVENTION

The aforementioned problems are overcome in the present invention comprising a calculator particularly adapted for easily and rapidly performing calculations on measurement data and converting measurement data between different measurement systems.

The calculator includes means for displaying the order or power of the measurement to separately designate square and cubic measurements. The keyboard includes keys for designating the order of each inputted number (i.e. linear, square, or cubic). The function unit insures that the orders or powers of corresponding operands are compatible and performs functions on the orders as necessary to calculate an output order. For example, if a cubic measurement is divided by a linear measurement, the output indicates that the result is a square measurement. The user need not remember whether the result is going to be a square or cubic dimension, but simply observes an indicator displayed with the result. This further facilitates use of the calculator and simplifies its operation.

Optionally, the calculator includes input keys for indicating a different measurement system associated with each number inputted. The calculator is capable of operating on the mixed system numbers to produce a result in any selected system. This also further simplifies operation of the calculator and enhances its capabilities. For example, a user can calculate the square inches in an elongated strip by entering the width in inches and the length in yards.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
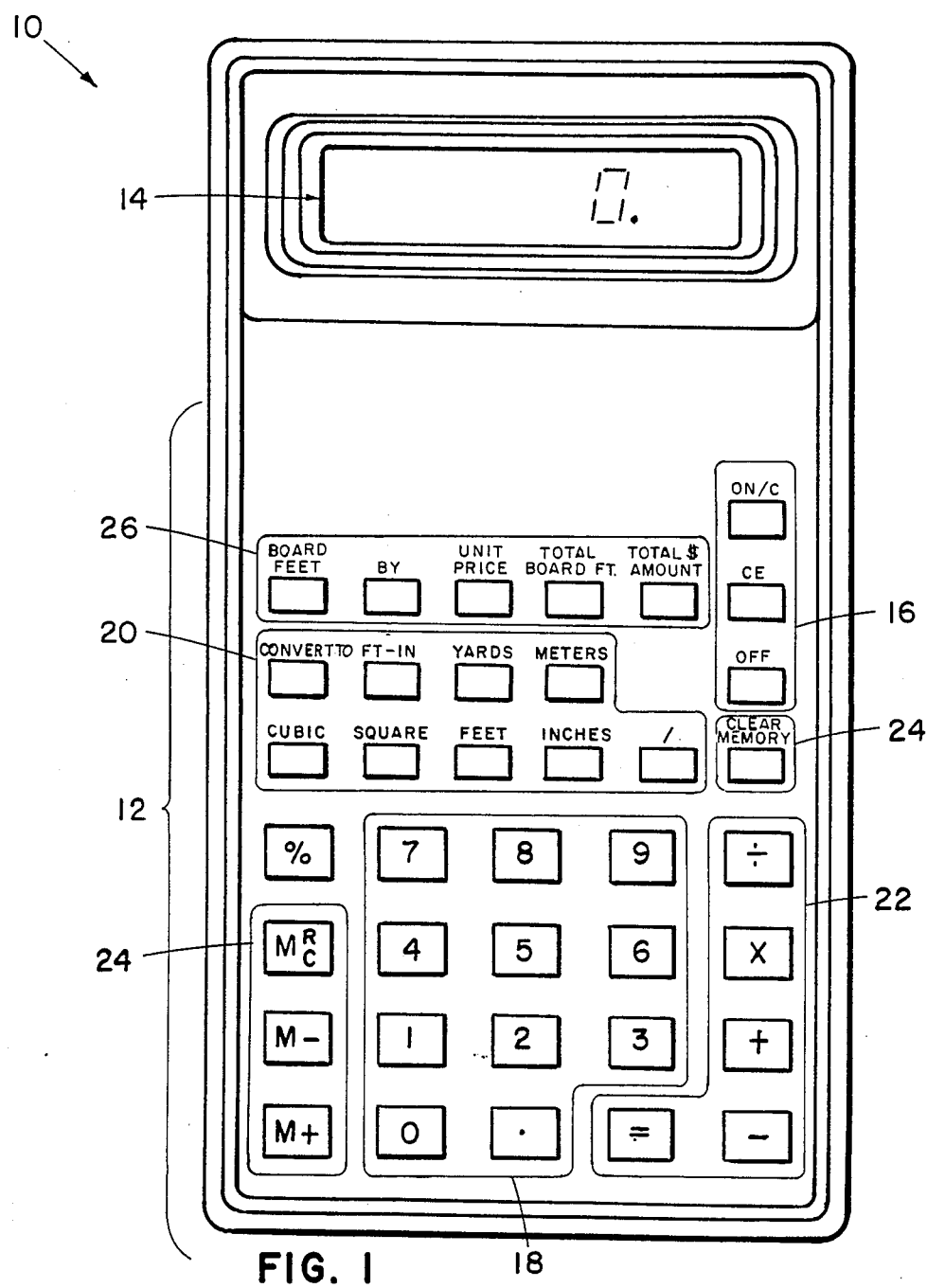
FIG. 1 is a plan view of the calculator keyboard and display.

A calculator constructed in accordance with a preferred embodiment of the invention is illustrated in FIG. 1 and generally designated 10. The calculator includes a keyboard or other input means 12 and a display or other display means 14.

I. KEYBOARD

The keyboard 12 includes several groups of keys including power/clear keys 16, numeric keys 18, measurement keys 20, function keys 22, memory keys 24, and board-feet keys 26.

The power keys 16 are conventional and used to turn the calculator on and off and to clear the display and/or memory. The function of the power keys 16 is as follows:

| Key | Function |
| --- | --- |
| ON/C | Turns power on and clears all registers including the memory register |
| CE | Clears a displayed entry prior to performing any operation on that entry |
| OFF | Turns all power off, clearing all registers including the memory register |

The numeric keys 18 are conventional and used to input numeric information and include the conventional decimal keys 0-9 and a decimal point (.).

The measurement keys 20 are used to perform several functions. First, they can designate or indicate a measurement system associated with selected input numbers. Second, the keys can convert any measurement displayed on display 14 to the corresponding measurement in a new measurement system. Third, certain measurement keys can indicate the order or power of the dimension (e.g. square or cubic). The functions of the measurement keys are as follows:

| Key | Function |
| --- | --- |
| YARDS | When following a numeric input, indicates that the input is expressed in decimal yards. When following the "CONVERT TO" key, indicates that the measurement displayed is to be converted to yards. |
| METERS | When following a numeric input, indicates that the input is expressed in decimal meters. When following the "CONVERT TO" key, indicates that the measurement displayed is to be converted to meters. |

-continued

| Key | Function |
| --- | --- |
| FEET | When following a numeric input, indicates that the input is expressed in decimal feet. When following the "CONVERT TO" key, indicates that the measurement displayed is to be converted to feet. |
| INCHES | When following a numeric input, indicates that the input is expressed in inches. When also following a numeric input followed by the FEET key, indicates that the inches are to be associated with the feet input. When following the "CONVERT TO" key, indicates that the display measurement is to be converted to decimal inches. Delineates the numerator and denominator of a fractional number. Can be used following depression of the "inches" key or to enter pure number fractions. |
| CONVERT TO | When followed by one of the "FEET-INCHES", "YARDS", "METERS", "FEET", or "INCHES" keys, indicates that the displayed measurement is to be converted to the dimension system designated by the next actuated key. |
| FEET-INCHES | Strictly a conversion key to be depressed following the "CONVERT TO" key to convert the displayed measurement to feet and inches, including fractional inches. |
| CUBIC | Indicates that the input measurement is third order or cubic. |
| SQUARE | Indicates that the input measurement is second order or square. |

The arithmetic function keys 22 are conventional and used to perform the functions of addition, subtraction, multiplication, and division. The equal sign (=) key indicates that the result of any and all previously selected functions are to be calculated and displayed.

The memory keys control the operation of the independent memory and have the following conventional functions:

| Key | Function |
| --- | --- |
| M+ | Adds the displayed number or measurement to the independent memory. |
| M− | Subtracts the displayed number or measurement from the independent memory. |
| MRC | Recalls and displays the contents of the independent memory without clearing the memory. |
| CLEAR MEMORY | Clears the contents of the independent memory without clearing the display. |

The board feet keys 26 are utilized in calculating the board feet within designated pieces of lumber perhaps of varying dimension, and cost information related thereto. The functions of the keys within this group are as follows:

| Key | Function |
| --- | --- |
| BOARD FEET | First actuation initiates the "board feet" mode. (To exit the "board feet" mode, the calculator must be cleared or turned off.) Actuation of this key following entry of lumber dimensions causes the calculator to display the number of board feet last inputted lumber size. |
| BY | Used to enter the dimension of a board or piece of lumber. The first two dimensions are assumed to be inches, while the third dimension is assumed to be feet. |
| UNIT PRICE | Actuated following entry of the cost per thousand board feet. |
| TOTAL BOARD FEET | Causes calculator to display total board feet calculated since entry of the "board feet" mode. |
| TOTAL $ AMOUNT | Causes calculator to display the total cost of the board feet calculated since entry of the "board feet" mode. |

II. DISPLAY

Figure 2:
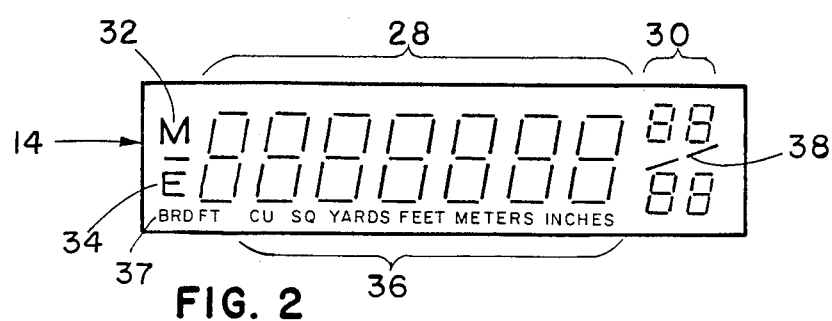
FIG. 2 is an enlarged view of the calculator display showing all of the actuable display segments.

The calculator display 14 is illustrated in greater detail in FIG. 2. The display includes a decimal display 28, a fractional display 30, a memory indicator 32, an error indicator 34, and measurement annunciators 36. The preferred decimal display 28 includes seven digits, each comprising a seven-segment display, for displaying a decimal number including a floating decimal point. Of course, other numbers of digits can be included in the display as desired. The fractional display 30 includes a two digit numerator and a two digit denominator separated by a slash 38. Activation of the memory display 32 indicates that a number is stored in the independent calculator memory. Activation of the error indicator 34 indicates that an unacceptable sequence of keys has been depressed or that overflow has occurred. All of the displays 28, 30, 32, and 34 are generally well known to those having ordinary skill in the calculator art.

Figure 3:
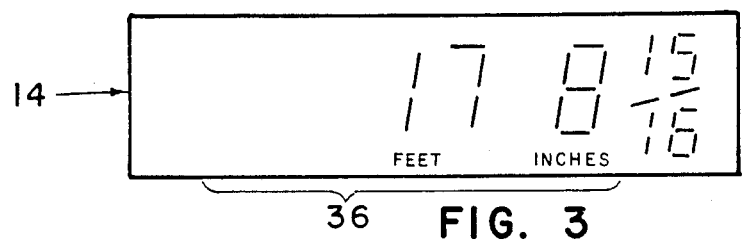
FIGS. 3-5 are exemplary measurements displayable on the calculator display.
Figure 4:
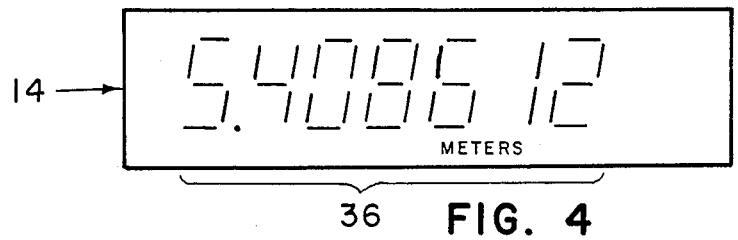
Figure 5:
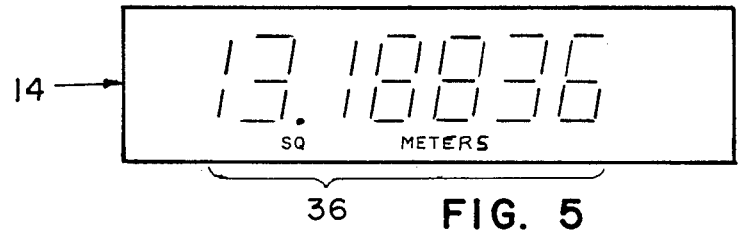

The measurement annunciators 36 include the six indicators or segments "CU", "SQ", "YARDS", "FEET", "METERS", and "INCHES". A "BRDFT" annunciator 37 is also included as will be described. These annunciators 36 are activated in response to depression of measurement keys 20 to indicate measurement system information associated with the displayed number. Specifically, the annunciators 36 can be displayed in the following combinations:
YARDS
FEET
METERS
INCHES
FEET INCHES
SQ YARDS
SQ FEET
SQ METERS
SQ INCHES
CU YARDS
CU FEET
CU METERS
CU INCHES FIGS. 3-5 illustrate exemplary measurement information displayed on the display 14. The information in FIG. 3 was entered using the following key sequence: "1", "7", "FEET", "8", "INCHES", "1", "5", "/", "1", and "6". FIG. 4 illustrates the result of then subsequently actuating the keys "CONVERT TO" and "METERS". The resultant number is a decimal meter measurement and the "METERS" annunciator in area 36 is activated to indicate that the number being displayed is in the decimal meters measurement system. FIG. 5 illustrates the display after further actuating the keys "X", "8", and "FEET". The resultant number is expressed in terms of square meters, and the annunciators "SQ" and "METERS" are activated.

III. OPERATION

The calculator includes conventional circuitry (not shown) responsive to the keyboard 12 for receiving input and performing calculations. The input number or measurement is displayed on the display 14; and the results of all calculations are also displayed on the display. The software for implementing the function of the calculator can be readily prepared by one having ordinary skill in the art in view of the present specification, particularly the flow charts of FIGS. 6–17.

The calculator is "key driven" or "keyboard driven", meaning that the internal operation of the calculator is dependent upon the last key entered. Major branching decisions within the software are made on the basis of the most recent key entry. Numeric input is entered using the numeric keys 18. Additionally, measurement information associated with the numbers can be inputted using the measurement keys 20. Measurements of mixed dimension systems can be utilized in any calculation—for example, inches can be added to yards or meters can be multiplied by feet. The calculator will display the result of any function in the measurement system of the first inputted measurement. Alternatively, the "CONVERT TO" key can be utilized in conjunction with the other measurement keys to convert the displayed measurement to any desired measurement system. The independent calculator memory can be used in conjunction with either purely numeric information or measurement information. Finally, the board feet keys 26 can be utilized in conjunction with the numeric keys 18 to calculate board feet and associated costs.

The operation of the calculator in non-measurement mode, i.e. when keys 20 and 26 are not used, will not be described in detail inasmuch as such operation is generally identical to conventional calculators. The remainder of the program flow description will be discussed in conjunction with either measurement calculations or board feet calculations which utilize the special function keys 20 and 26.

Figure 6:
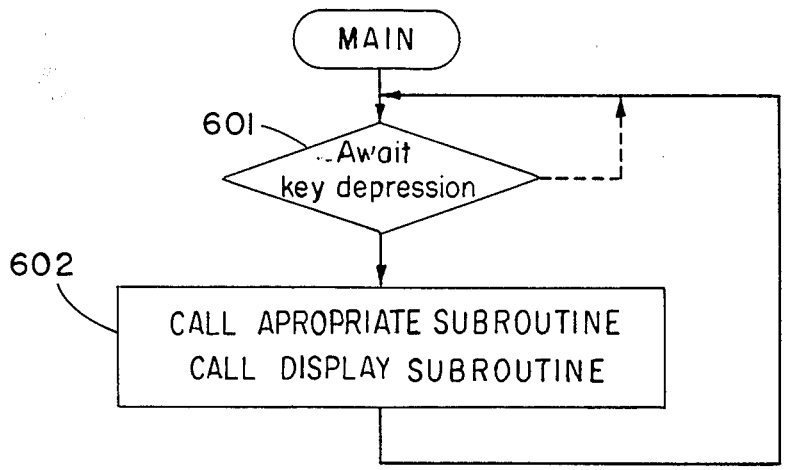
FIGS. 6-17 are flow charts illustrating the operation of the calculator.
Figure 7:
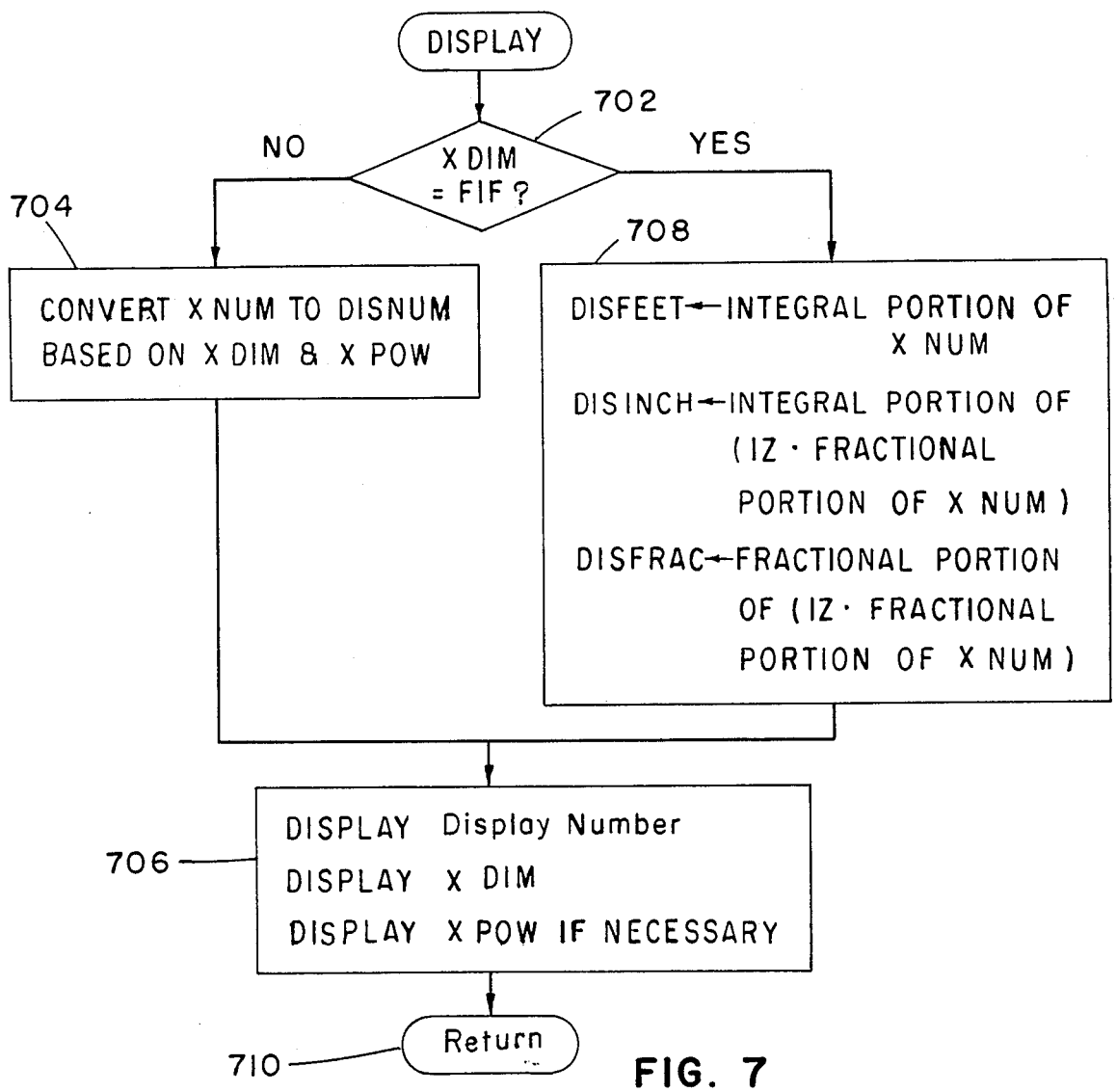

The program flow of the calculator is illustrated in FIGS. 6–17. FIG. 6 illustrates the MAIN subroutine wherein the calculator awaits 601 a key depression. When a key is depressed, the appropriate subroutine corresponding to that key is called 602; and then the DISPLAY subroutine is also called. Program flow then returns to block 601 wherein the calculator awaits depression of the next key.

Two registers are maintained internally by the calculator to be used in performing its calculations. The first is the X register which contains either the most recent number input or the most recent result of a calculation. The second is the Y register which is the second most recent number input. Each register includes three separate portions. For example, the X register includes XNUM, XDIM, and XPOW. The variable XNUM contains the numeric portion of the measurement information expressed. XDIM indicates the measurement system associated with the number (e.g. feet, yards, or meters). XPOW indicates the order or power of the measurement (e.g. linear, square, or cubic).

The DISPLAY subroutine (FIG. 7) displays the measurement information within the X register, which is either the current input number or the result of a calculation. A determination 702 is made to determine whether the measurement system (XDIM) is "feet-inch-fractions". If not, XNUM is converted 704 to DISNUM, the display number. Because XNUM is stored in decimal feet, the conversion from XNUM to DISNUM is straightforward and generally well known to those having ordinary skill in the art. For example, if XDIM is "inches", XNUM is multiplied by 12 to produce DISNUM. The conversion 704 is made based upon XDIM which indicates the measurement system associated with XNUM, and XPOW, which indicates the order of the measurement information. Following the conversion 704, the display number is displayed 706 via the decimal digits 28, while XDIM is displayed by illuminating the proper segments of the measurement information 36. XPOW is displayed if necessary, specifically if the measurement is square (SQ) or cubic (CU). XPOW is not displayed if the measurement is linear or first order.

If the determination 702 is that XDIM is "feet-inch-fractions", three separate variables, DISFEET, DISINCH, and DISFRAC must be calculated 708. DISFEET is equal to the integral portion of XNUM. DISINCH is equal to the integral portion of twelve times the fractional portion of XNUM. DISFRAC is equal to the fractional portion of twelve times the fractional portion of XNUM. "Feet-inch" information is displayed in the format illustrated in FIG. 3. DISFEET is displayed on the five left-most decimal digits 28 approximately above the FEET indicator. DISINCH is displayed on the two right-most decimal digits 28 above the INCHES indicator. DISFRAC is converted to a fractional format having a denominator of 64 and then reduced to its lowest possible terms. This fractional information is displayed on the fractional output 30 with the numerator above the slash line 38 and the denominator below this line. When displaying information in the "feet-inch-fractions" mode, both the FEET and INCHES segments of the information 36 are activated. As before, XPOW is displayed as "SQ" or "CU" if the order is two or three, indicating square or cubic measurements. The DISPLAY subroutine concludes by returning 710 to the MAIN subroutine (see FIG. 6).

Figure 8:
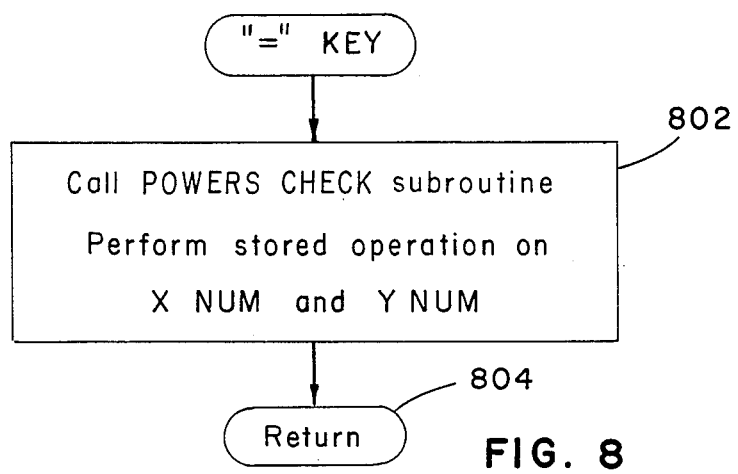

Control branches to the EQUALS subroutine illustrated in FIG. 8 when the "=" key is actuated. This subroutine calls 802 the POWERS CHECK subroutine and then performs 802 the stored operation on XNUM and YNUM. Program flow then returns 804 to the MAIN subroutine to await a subsequent key actuation.

Figure 9:
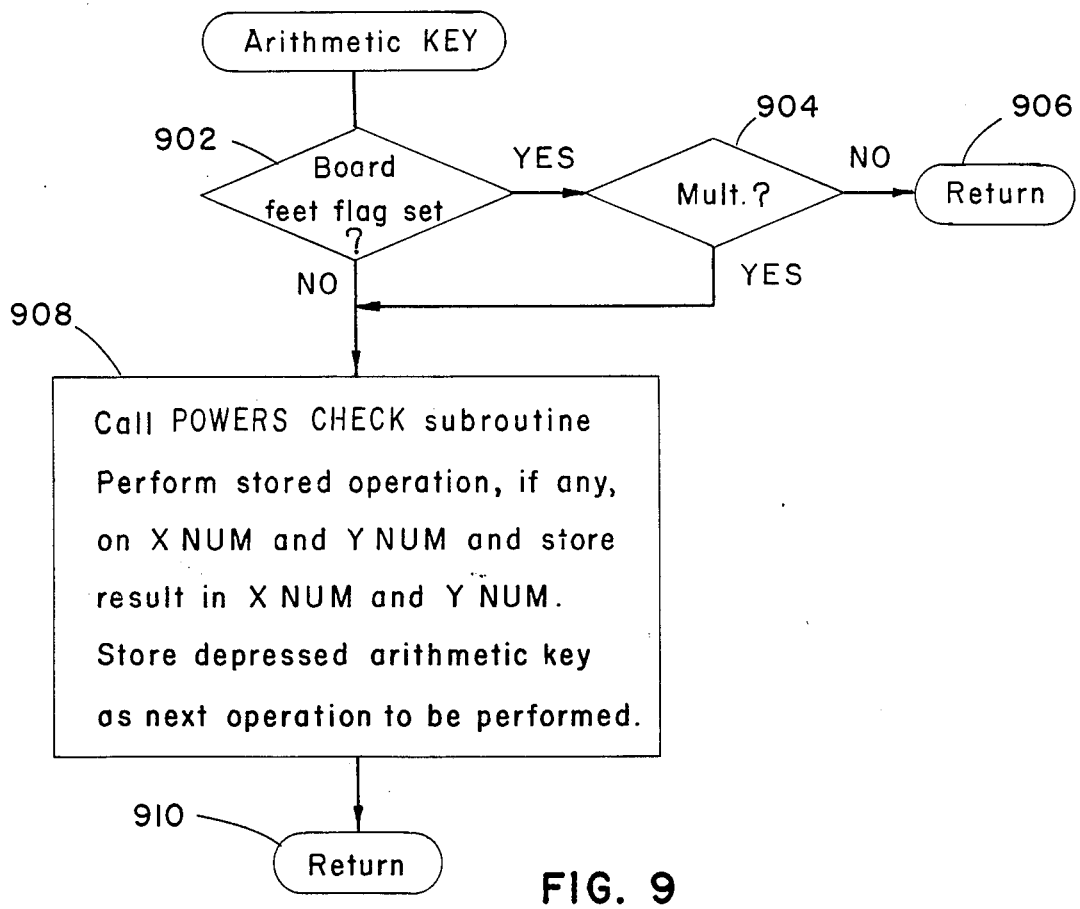
Figure 10:
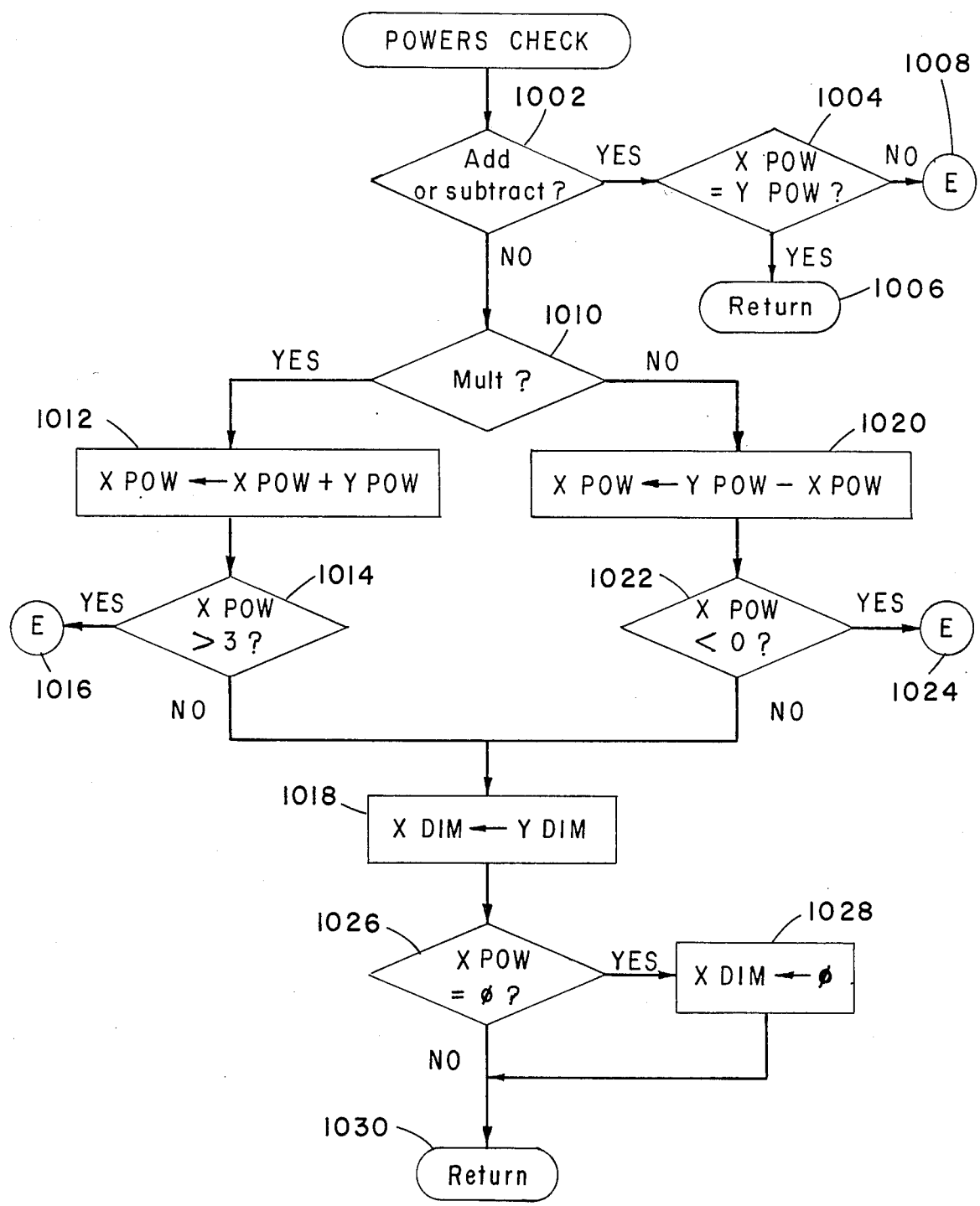
Figure 11:
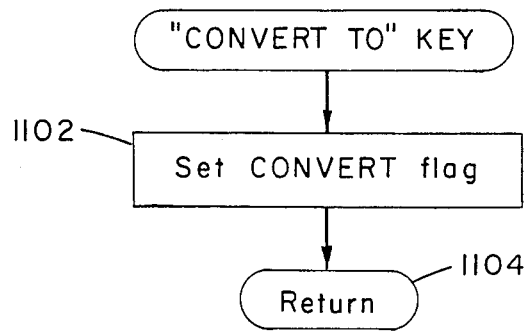

Depression of any one of the arithmetic keys "+", "−", "×", or "÷" causes program flow to branch to the ARITHMETIC subroutine illustrated in FIG. 9. A determination 902 is made to decide whether the "board feet" flag is set indicating that the calculator is in the "board feet" mode. If so, a second determination 904 is made to decide whether the "×" key has been actuated. If not, program flow returns 906 to the main subroutine to await a subsequent key actuation. If so, program flow continues to block 908 whereupon (1) the POWERS CHECK subroutine is called, (2) the stored operation is performed on XNUM and YNUM, (3) the result is stored in XNUM and YNUM, and (4) the actuated arithmetic key is stored as the next operation to be performed. Program flow then returns 910 to the MAIN subroutine (see FIG. 6).

The POWERS CHECK subroutine (FIG. 10) is called whenever an arithmetic operation is to be performed. If the operation is addition or subtraction, the subroutine checks to see if the orders or powers of the two measurements are the same. If the operation is multiplication or division, the routine checks to see if the power of the resultant number will be acceptable, which in the current embodiment means that the answer will be non-dimensional, linear, square, or cubic corresponding to powers of 0, 1, 2, and 3, respectively. Upon initiation of the subroutine, a decision 1002 is made to determine whether the "+" or "−" key is actuated. If so, XPOW is compared 1004 to YPOW; and if they are equal, program flow returns 1006 to the main subroutine. If the powers are not equal, the error indicator "E" 34 on the display 14 (see FIG. 2) is illuminated 1008. If neither the "+" nor the "−" is actuated, program flow passes to block 1010 wherein a decision is made to determine whether the "×" or "÷" key is actuated. If multiplication is to be performed, XPOW is given 1012 a value equal to the previous XPOW plus YPOW. The new XPOW is checked 1014 to determine whether it is greater than 3. If so, an error is indicated 1016 on the display. If not, program flow passes to block 1018. In case of division, XPOW is given 1020 a new value which is equal to YPOW minus the previous XPOW. The new XPOW is checked 1022 to determine whether it is less than zero. If so, an error is indicated 1024. If not, program flow passes to block 1018 wherein XDIM is given the value of YDIM to insure that the results will be displayed in the measurement system of the first inputted number. Other display decisions could be adopted, such as displaying all results in terms of the most recently inputted measurement system. The XPOW is then checked 1026 to determine whether it is equal to zero. If it is, XDIM is also set 1028 to zero indicating that the result is nondimensional and no longer within any measurement system. In either case, program flow returns 1030 to the main subroutine (see FIG. 6).

In the CONVERT subroutine, the CONVERT flag is set 1102 and program flow returns 1104 to the main subroutine (see FIG. 6).

Figure 12:
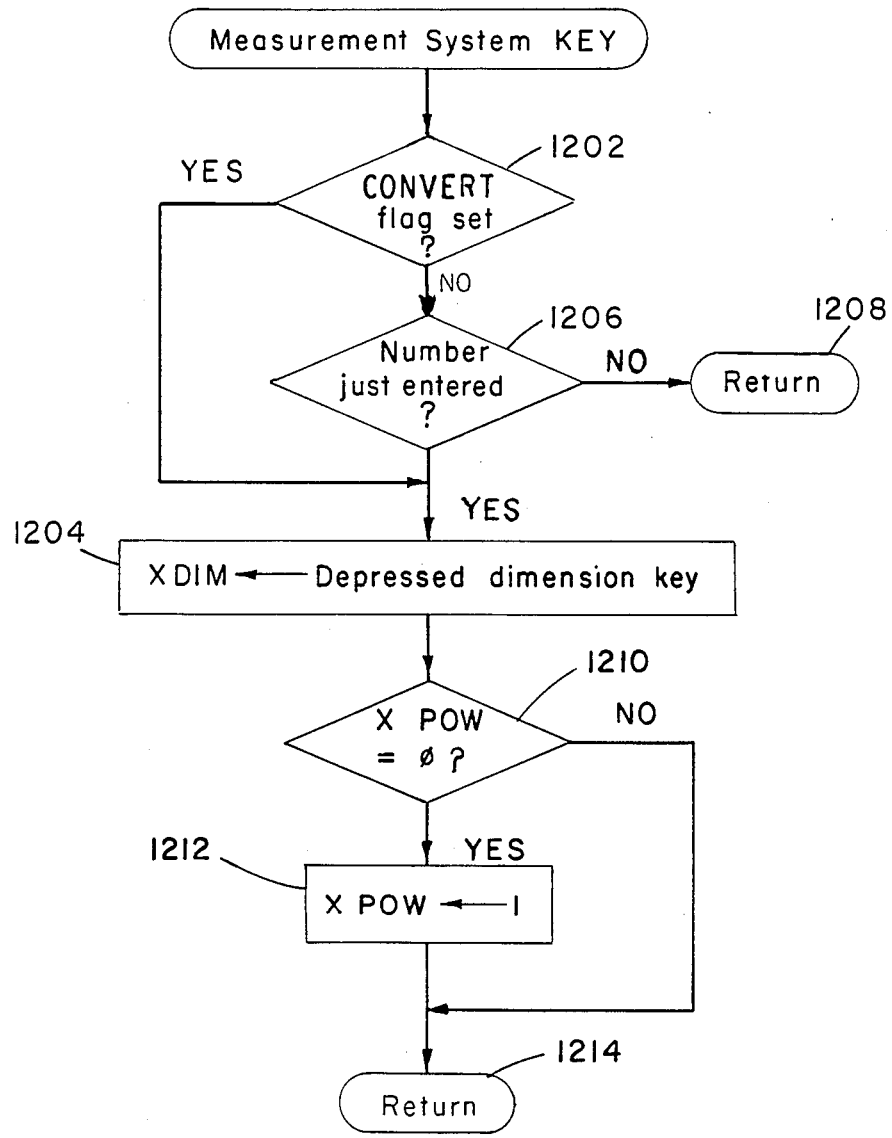

FIG. 12 illustrates the program flow in response to depression of a measurement system key including any of "feet-inches", "yards", "meters", "feet", or "inches". A decision 1202 is made to determine whether the CONVERT flag is set. If so, program flow immediately branches to block 1204. If not, a second decision 1206 is made to determine whether a number has just been entered via the numeric keys 18 (see FIG. 1). If not, program flow immediately returns 1208 to the MAIN subroutine (see FIG. 6). If so, program flow then continues to block 1204 wherein XDIM is given a value corresponding to the actuated measurement system key. A third decision 1210 is then made to determine whether XPOW is equal to zero. If so, XPOW is given 1212 a default value of 1. In either case, program flow returns 1214 to the MAIN subroutine (see FIG. 6).

Figure 13:
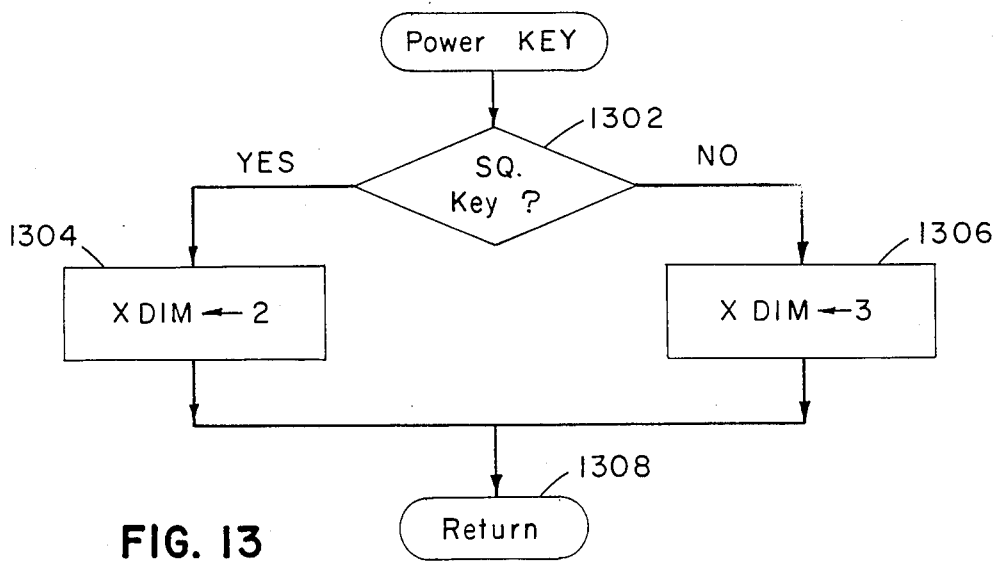

FIG. 13 illustrates the program flow upon actuation of a power key, namely either the "CU" key or "SQ" key. A decision 1302 is made to determine if the SQ key has been actuated. If so, XDIM is given 1304 the value 2. If not, XDIM is given 1306 the value 3. In either case, program flow returns 1308 to the MAIN subroutine (see FIG. 6).

Figure 14:
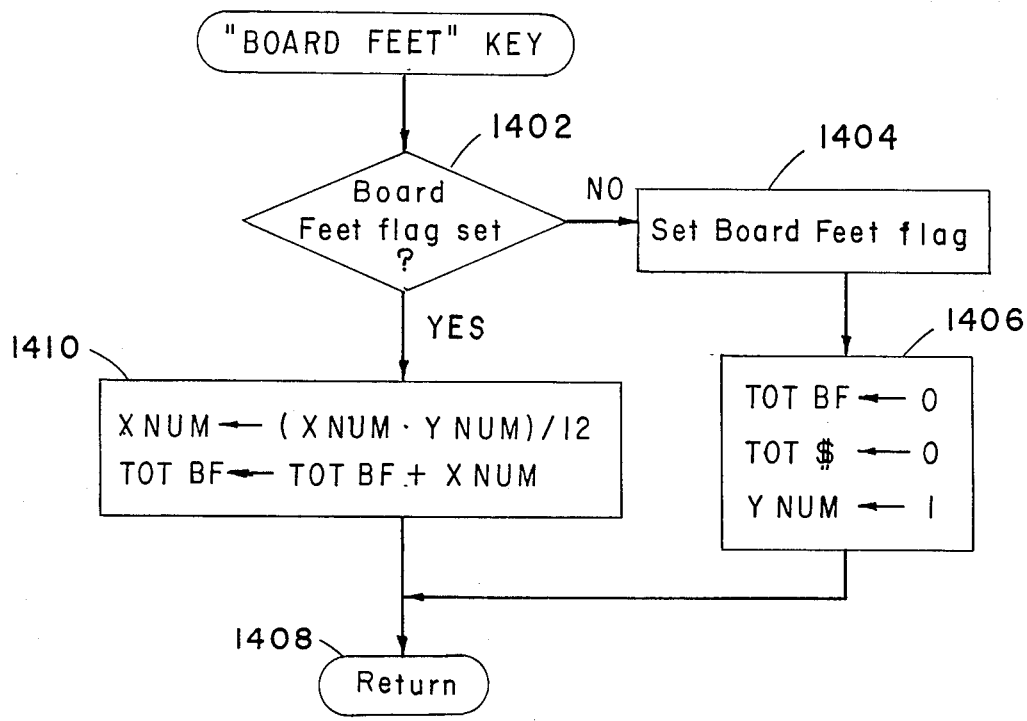

FIG. 14 illustrates the program flow in response to actuation of the "board feet" key, which is a dual-function key. Upon the first actuation of this key following clearing of the calculator, the calculator enters the "board feet" mode. Upon the second actuation of this key following clearing of the calculator, the calculator displays intermediate board feet calculations related to the number of pieces of each given size. Turning specifically to the program flow, a decision 1402 is made to determine whether the "board feet" flag is set. If not (indicating that this is the first key actuation), the variable TOTBF is given 1406 the value zero; the variable TOT$ is given the value zero; and the variable YNUM is given the value 1. Program flow returns 1408 to the MAIN subroutine (see FIG. 6). If the "board feet" flat is set, the XNUM and TOTBF variables are updated 1410. Specifically, XNUM is given a value equal to the previous XNUM times YNUM divided by 12; and TOTBF is given a value equal to the previous TOTBF plus the newly calculated XNUM. The program flow then return 1408 to the MAIN subroutine (see FIG. 1).

Figure 15:
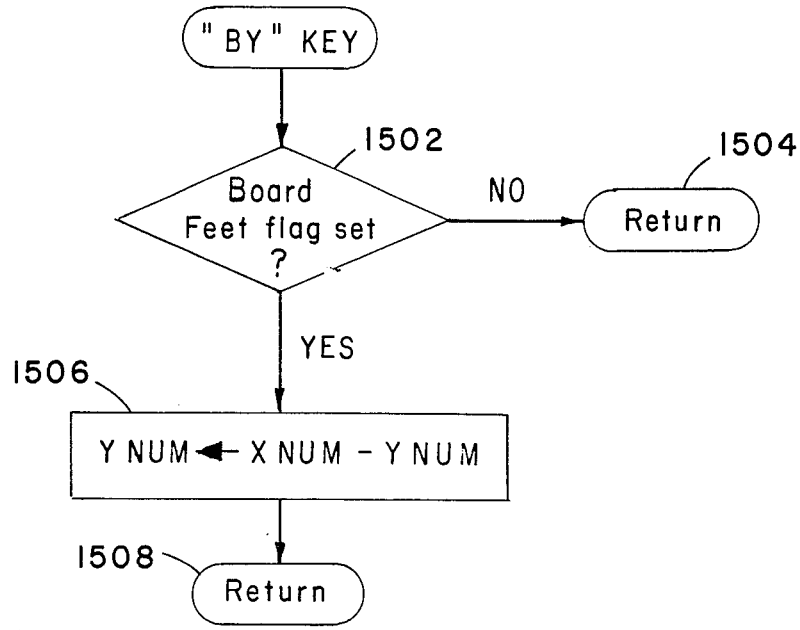

Actuation of the BY key initiates the program flow illustrated in FIG. 15. A decision 1502 is made to determine whether the "board feet" flag is set. If not, no action is taken in response to actuation of the BY key and program flow returns 1504 to the main subroutine (see FIG. 6). If so, YNUM is given a new value equal to XNUM times the previous value of YNUM 1506. Program flow then returns 1508 to the main subroutine (see FIG. 6).

The calculator 10 therefore receives three input dimensions for each size piece of lumber—a thickness, a width, and a length. The thickness and width are understood to be in inches, while the length is understood to be in feet. Consequently, the board feet in a number of pieces of given size is calculated according to the following formula:

$$\frac{\text{thickness} \times \text{width} \times \text{length}}{12} \times \text{number of pieces}$$

Figure 16:
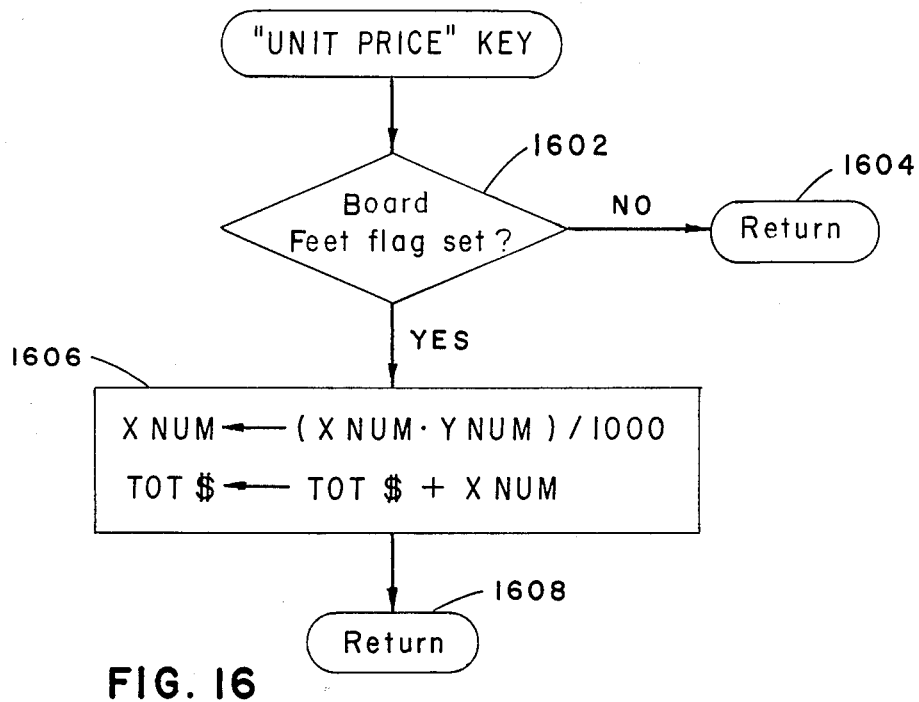

Actuation of the UNIT PRICE key initiates the program flow illustrated in FIG. 16. The "board feet" flag is checked 1602 to determine whether it is set. If it is not set, program flow returns 1604 to the MAIN subroutine (see FIG. 6). If the flag is set, XNUM and TOT$ are updated 1606. Specifically, XNUM is given a new value equal to the previous XNUM times YNUM divided by 1,000; and TOT$ is given a new value equal to the previous value of TOT$ plus the newly calculated XNUM. Program flow then returns 1608 to the MAIN subroutine (see FIG. 6). The cost of such lumber is therefore calculated according to the following formula:

$$\frac{\text{board feet} \times \text{cost per thousand board feet}}{1000}$$

Figure 17:
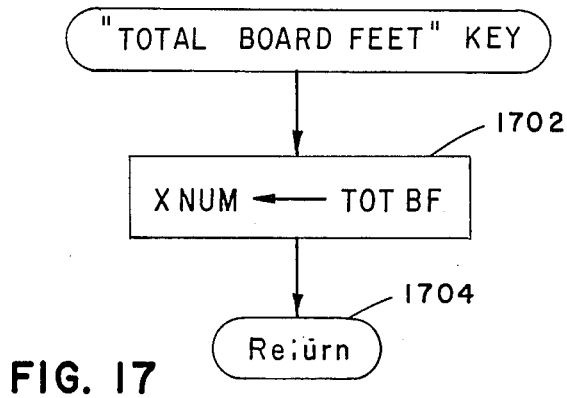

FIG. 17 illustrates the program flow in response to actuation of the TOTAL BOARD FT key. The variable TOTBF is placed 1702 in the XNUM register for display; and program flow returns 1704 to the MAIN subroutine (see FIG. 6).

Figure 18:
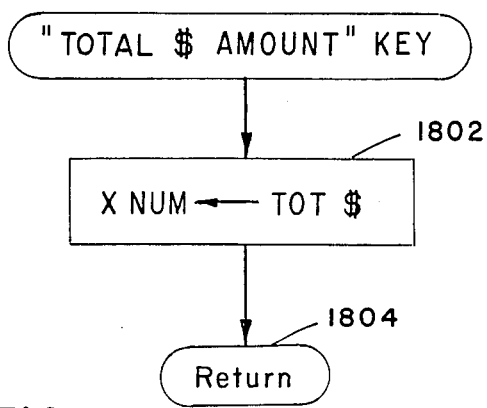

Finally, the program flow initiated by the TOTAL $ AMOUNT key is illustrated in FIG. 18 TOT$ is placed 1802 in XNUM for display; and program flow returns 1804 to the MAIN subroutine (see FIG. 6).

The present calculator 10 easily and accurately performs calculations on measurement information. Calculations on measurements from different measurement systems are facilitated in part because of the capability to easily and uniquely identify each inputted number with an associated measurement system. The conversion of all inputted information to a common measurement system, namely decimal feet, simplifies and facilitates internal calculations and the conversion routines required to convert information between the various measurement systems. In short, the calculator eliminates the necessity of "mode shifting" to convert measurement information among different systems. Inputting and displaying the order or power of all calculations eliminates the necessity of the user having to keep track of the order of all measurements, such as linear, square, and cubic dimensions. Finally, the calculator readily and accurately calculates board feed and associated board feet costs. Accordingly, the calculator provides strong, albeit specialized, computing capabilities within a hand-held unit.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A calculator comprising:
   input means for inputting measurements including a dimension power indicative of the order of at least certain measurements;
   storage means for storing at least two inputted measurements;
   function means for performing selected functions on the stored measurements to produce an output measurement, said function means including first checking means for checking the dimension powers of the stored measurements for compatibility with each other for certain functions, said function means further including power function means for generating an output dimension power based on the stored dimension powers and the selected function, said function means further including second checking means for checking the output dimension power to determine whether it is acceptable; and
   display means for displaying the output measurement including power display means for displaying selected ones of the output dimension powers, said display means being responsive to said first and second checking means and including means for displaying an error signal when the dimension powers of the stored measurements are incompatible or when the output dimension power is unacceptable.

2. A calculator as defined in claim 1 wherein said first checking means includes means for determining whether the dimension powers of the stored measurements are equal for addition and subtraction.

3. A calculator as defined in claim 1 wherein said power function means includes means for adding and subtracting the dimension powers of the stored measurements for multiplication and division, respectively.

4. A calculator as defined in claim 3 wherein acceptable output dimension powers include zero, first, second, and third order corresponding to nondimensional, linear, square, and cubic measurements respectively.

5. A calculator for performing measurement calculations comprising:
   input means for inputting measurements each including a number, a measurement unit, and a measurement order for each measurement of second order or higher;
   storage means for storing the inputted measurements;
   function means for performing selected functions on the inputted measurements to produce an output measurement, said function means including generator means for generating an output measurement order associated with the output measurement, said generator means including means for adding and subtracting the input measurement orders for the functions of multiplication and division respectively to generate the output measurement order, said generator means further including checking means for checking the output measurement order to determine whether it is acceptable; and
   display means for displaying the output measurement including a number, a measurement unit, and a measurement order for each output measurement of second order or higher, said display means being responsive to said checking means for displaying an error signal when the output measurement order is unacceptable.

6. A calculator as defined in claim 5 wherein said input means further includes default means for establishing a default order indicator for first order or linear measurements.

7. A calculator as defined in claim 5 wherein acceptable output order indicators are those for zero, first, second, and third order corresponding to nondimensional, linear, square, and cubic measurements respectively.

8. A calculator as defined in claim 5 wherein said generator means includes second checking means for checking the input measurement orders to insure that they are compatible for the functions of addition and subtraction; and further wherein said display means is further responsive to said second checking means for displaying an error signal when the input measurement orders are incompatible.

* * * * *